March 12, 1940.  E. A. THOMPSON  2,193,305
BRAKE AND CLUTCH CAPACITY CONTROL
Filed Aug. 21, 1937  2 Sheets-Sheet 1

Inventor
Earl A. Thompson
By Blackwood, Spencer & Flint
Attorneys.

Patented Mar. 12, 1940

2,193,305

UNITED STATES PATENT OFFICE 2,193,305

BRAKE AND CLUTCH CAPACITY CONTROL

Earl A. Thompson, Birmingham, Mich., assignor to General Motors Corporation, Detroit, Mich., a corporation of Delaware Application August 21, 1937, Serial No. 160,195

20 Claims. (Cl. 74—262)

The invention relates to improvements in controlling devices for variable speed power transmissions especially applicable where such are used to connect the engine of a modern motor vehicle with the load, the principal object being the provision of a control device which coordinates the relative torque requirement of the transmission with the torque demand of the vehicle operator.

Another object is to provide a control regime for variable speed transmissions wherein gradually engageable elements are utilized to initiate and to establish drive when shifting from one speed ratio to another, and wherein a controllable ratio of torque between two such exemplary paths may be maintained, yielding an extremely smooth transition of shockless character.

Another object is to provide a continuously operative control effective not only at given intervals, but continuously adjustable, whereby the torque capacity of drive in any newly selected speed ratio is developed in advance of an increase or decrease in the torque requirement or the operating load, and may be so modified during the interval of engagement of drive in the newly selected speed ratio.

A further object is to provide a form of fluid pressure control subject to operator manipulation wherein a constantly available coordinating pressure for the above stated objects is maintained.

An additional object is to provide a simple efficient auxiliary gear for present day gearboxes in motor vehicles.

The above being among the objects of the present invention, the same consists in certain features of construction and combination of parts hereinafter described with reference to the accompanying drawings, and claimed with the above objects in view.

The accompanying drawings illustrate one suitable embodiment of the present invention, wherein like numerals refer to equivalent or identical parts in the various views; and wherein.

Figures 1, 2:
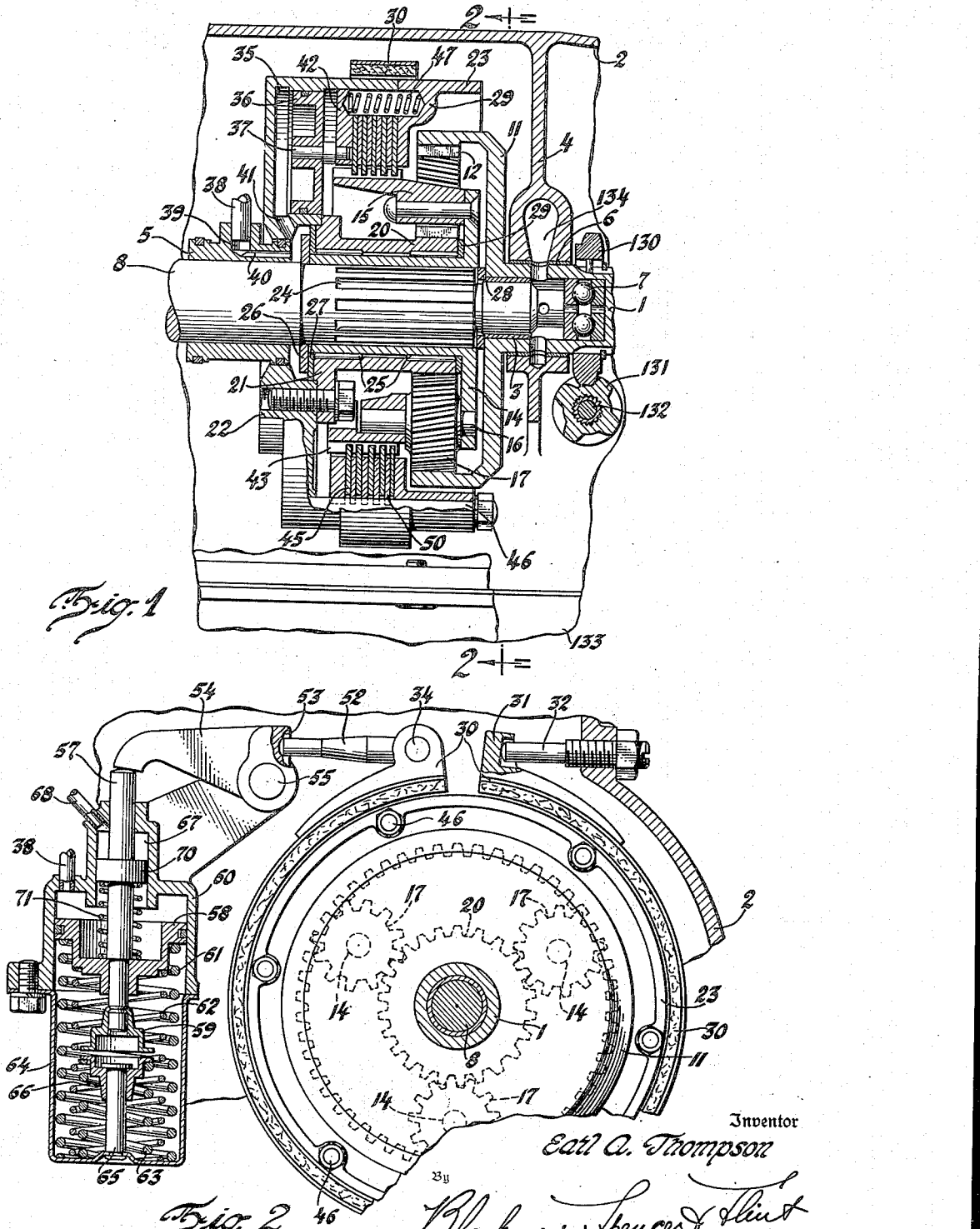
Figure 1 is an elevation section of a two-speed gearbox, having gradually engageable friction means for establishing drive in either of the two speed ratios, as an applicatory example of my invention.
Figure 2 is a section view taken at 2—2 of Figure 1, showing the actuating means for the aforesaid friction means, in the present example the actuation being provided by fluid pressure and energy storing means.

The arrangement of Figure 1 is a section elevation of a typical two speed coupling gear unit which may be used for either overdrive or reduction for one of the speeds, and direct drive for the other. It is obvious that either of shafts 8 or 1 of Figure 1 may be the driving shaft of a transmission assembly so that if shaft 8 is power connected, shaft 1 will be driven through the gears at over-speed, and if shaft 1 be power-connected, shaft 8 will be driven through the gears at a reduction ratio.

Shaft 1 may be supported in a web 4 of the transmission casing 2 by bearing 6, and shaft 8 by bearing 5 acting as a gland for fluid pressure piping as will be explained.

The shafts 1 and 8 are piloted at thrust bearing 7 and by sleeve 3. Either of shafts 1 or 8 may be connected to the power plant of a motor vehicle, or to the input or power output shafts of other forms of change speed gearboxes. The inward extension of shaft 1 terminates in drum 11 having internal gear teeth 12, and the inward extension of shaft 8 is splined at 24 for flange 14 attached to splined drum 15 acting as a planet carrier, for spindles 16 on which planet gears 17 rotate, meshing with teeth 12, and with sun gear 20 extending to the left in hollow shaft 21 bolted to drum flange 22. Flange 22 is attached to drum member 23, the external surface of which may be gripped by brake 30 under the influence of the fluid pressure servo motor mechanism of Figure 2.

Sleeve 21 rotates on shaft 14 through bearings 25. Thrust members 26 and 27 maintain axial alignment between sleeve 21 and shaft 8, and member 28 sustains thrust between shaft 8 and drum 11. The thrust washer 29 transmits thrust between sun gear 20 and flange 14.

Drum member 23 supports braking reaction and is recessed to form cylinders 35 for pistons 36, receiving fluid pressure from passage 41, drilling 40 of gland passage 39, and pipe 38 recessed in gland 5.

Pistons 36 may press on spacer pins 37 and move presser plate 42 sliding on bolts 46 of drum 23. Clutch plates 45 mounted on splines 43 are interleaved with plates 50 rotating with drum 23 by means of bolts 46 acting as keys. Springs 47 are recessed in presser plate 42 and flange 29 of drum 23 to exert normally a declutching force.

The clutch members are, then, normally free from drag.

Fluid pressure in cylinders 35, therefore, opposes springs 47, in applying and sustaining clutch 45-50, which, by inspection of the couple established by carrier 15 and sun gear 20, compels direct drive when engaged.

Brake member 30 when locked on drum 23 compels drive through the gearing, either overdrive or reduction, depending upon the designer's use of the gear unit. This unit is to be regarded as being capable of placement in a transmission assembly with either of shafts 8 or 1 power-connected, or joined serially to either input or output members of other gearbox assemblies so that its characteristics may be superimposed upon those of other, associated variable speed drives. The brake and clutch friction members are alternately actuated, as will be explained.

Referring now to Figure 2, the sectional view shows the actuation and release means, utilizing fluid pressure for the brake 30.

The anchor end 31 of reaction brake 30 is secured to the casting 2 by adjustable stud 32, the movable end 30 being pivoted at 34 to receive thrust rod 52, fitting notch 53 of rocker arm 54 pivoted at 55 to the casing. Piston rod 57 mounted to slide in cylinder 60 may exert a thrust on rocker arm 54, or may be retracted by fluid pressure in cylinder 60.

Piston 58 in cylinder 60 has limited sliding motion with respect to actuator rod 57, so that as a fluid pressure column is admitted through pipe 38 to cylinder 60, it may adjust for a given capacity of inflow before abutment 59 fixed to rod 57 is met.

The fluid transmitted force moving piston 58 as an actuating member is exerted against springs 61 and 62 which are retained by strap 64 fastened to the cylinder 60. Abutment rod 65 fixed to strap 64 carries sliding abutment 66 mating with abutment 59. Spring 63 offers resistance to the motion of abutment 66 and to the motion of piston 58 through abutment 59.

Rod 57 carries affixed piston 70 sliding in small cylindrical bore 67 of cylinder 60, receiving fluid pressure from pipe 68. Spring 71 may exert a downward pressure on piston 58, from the lower face of piston 70 as a reaction point.

The system just described, in the absence of fluid pressure in cylinder 67 normally applies the force of springs 61 and 62 to brake 30. This compels geared drive, and as shall be explained in detail later, the absence of a fluid pressure column in the ratio actuation system establishes "no drive" in the clutch 45—50.

Disregarding the effect of pressure in small cylinder 67, the admission of pressure to cylinder 60 tensions springs 61 and 62, the initial fluid capacity increase being aided by booster spring 71, assuming no fluid pressure variation in cylinder 67.

There are a series of predetermined positions of rod 57 corresponding to degrees of release of brake 30, or corresponding to a series of net holding capacity values, which may be considered as a reaction torque capacity range, in total.

A corresponding series of pressures therefore may exist in cylinder 60 for opposing the springs 61 and 62, to obtain the predetermined brake holding values, or brake capacity values. At this point, the rotational, self-wrapping action of brake 30 will be disregarded.

Assuming the same servo pressures in cylinder 60 as in clutch cylinders 35, it will be seen that as fluid pressure builds up in cylinder 60, to reduce brake holding capacity through a predetermined range, the same pressure building up in cylinders 35 is simultaneously inc using the driving capacity of clutch 45—50, producing a measured overlap of torque values in brake 30 and the clutch.

If the above described action has taken place with no pressure in cylinder 67, the distance to which piston 58 and rod 57 have moved has made it necessary for a certain pressure value to be built up in cylinder 60. Because of the overlap of torque between brake 30 and clutch 45—50, the sustaining pressure on clutch 45—50 at the point of brake release will therefore be of a maximum value comparable to the capacity of the external system furnishing fluid pressure to cylinder 60, from pipe 38.

Now if the brake releasing action is taking place with a certain value of fluid pressure existing in cylinder 67, the opposing fluid force needed to be supplied to cylinder 60 to act against springs 61 and 62 is less, for the brake release point to be arrived at by rod 57.

The net action of the compensating pressure in cylinder 67 is therefore to vary the required pressure in line 38 and cylinder 60 at which the clutch 45—50 must sustain the drive, which begins at the moment the brake is fully released. The torque capacity of clutch 45—50 varies with pressure, within the limit of the maximum pressure available in line 38 to which it may respond according to its net effective area and coefficient of friction; and the limit of compensation of pressure in cylinder 67 predetermined to modify the line pressure at the end point of brake release.

Figure 3:
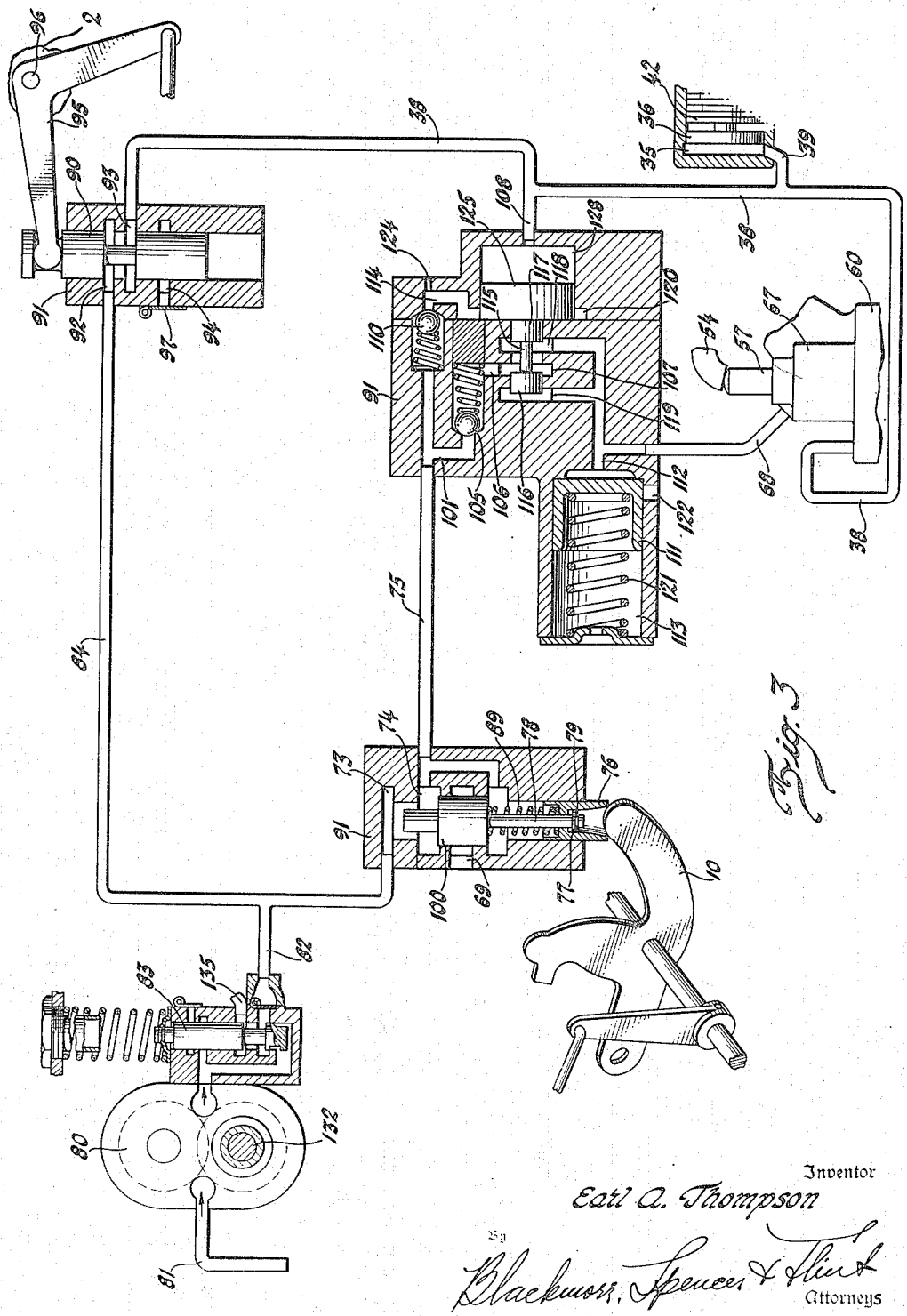
Figure 3 is a schematic view of a control system embodying my invention, wherein a source of servo fluid pressure is connected to the above noted actuating means, controlled by manually manipulable devices.

The main result of the coordinated compensation system is to establish a range of direct drive coupling clutch capacities, controllable for different driving conditions, as will be apparent in the discussion of the control diagram of Figure 3.

It should be understood that the variation of torque capacity provided by my method is effective during the ratio shift interval, and is a transitional control. When the predetermined transfer of drive has occurred, the full capacity of the members sustaining the drive is then effective.

For example, if the momentary overall torque requirement is at or near maximum for the power plant equipped with my gear and control arrangement, the compensation pressure in cylinder 67 may be rapidly exhausted at a graduated and a controlled rate, so that the clutch 45—50 will have full capacity to meet the need. Likewise if the requirement is at or near minimum, the compensation pressure may be increased, so that the clutch capacity will be commensurate with the demand, enabling a smooth transition from step-ratio geared drive to direct coupled drive to be made. A further objective is fulfilled, in that the compensation pressure in cylinder 67, if arranged to vary rapidly with torque demand, can always maintain a margin of clutch capacity in excess of slipping torque, making it possible to avoid entirely any abuse of the friction surfaces 45 and 50.

The above description covers a considerable amount of interaction between the elements of the actuation and control systems. In fact, the above takes place within a very few seconds, in that the controls for the fluid pressures in lines 38 and 68 are arranged to provide instant response, when equipped with a proper source of fluid servo power.

In Figure 3 the servo pump assembly 80 draws liquid from the sump or reservoir (not shown) through pipe 81, and a uniform pressure is maintained in pump main 82, as determined by a pressure regulator valve 83 which regulation action is not an essential part of this invention except for the requirement of uniform pressure in line 82.

In Figure 1 gear 130 pinned to shaft 1 is shown meshing with gear 131 fixed to cross-shaft 132, which is shown in Figure 3, as the primary drive for pump 80. Suction pipe 81 of Figure 3 may draw oil from transmission sump 133 of Figure 1, and pipe 135 of Figure 3 may be connected to chamber 134 of Figure 1 for supplying the bearings and gears thereof with lubricant. If the shaft 8 is connected to the engine for overspeed drive, the gear 130 may be driven from shaft 8 in order to have a constantly available servo and lubrication supply.

The selector valve 90 in valve body 91 is a simple three-port valve of two positions; when in the "up" position connecting inlet pressure port 92 to servo line port 93; and when in the "down" position connecting servo line port 93 to exhaust port 94. Lever 95 pivoted at 96 on a convenient portion of the casing 2 or body 91 shifts the valve 90 between the said positions, as controlled by external linkage to the drive control, which latter may be of any convenient form. A typical arrangement is shown in my pending U. S. S. N. 130,956, filed March 15, 1937, wherein valving similar to valve 90, and identical in function, is manually controlled. Pump main 82 connects through line 84 to port 92.

When the valve 90 is in the "up" position, the pump pressure flows through servo line 38 to cylinder 60, and is exerted upon piston 58 of Figure 2 compressing springs 61—62, and releasing the brake 30 of Figures 1 and 2, at the same time flowing through extension 39—40—41 of line 38 to cylinders 35 behind pistons 36, compressing springs 47 and loading the clutch 45—50 of Figure 1. This corresponds to direct drive in the transmission unit of that figure.

When the directive valve 90 is in the "down" position, the pump pressure from line 84 is shut off, and the servo line 38 may drain back to the sump through exhaust port 94 and through blade valve 97; allowing springs 61—62 to apply the brake 30, and relieving clutch 45—50 of load, while springs 47 aid in releasing the clutch. This corresponds to geared drive in the unit of Figure 1. The orifice pressure at 97 is predetermined along with the tension of the blade valve, so that the ratio shift characteristic for a given installation will bear a proportional relation to the allowed time lapse for the shift interval.

The driver control may therefore alternate the valve 90 between the two positions, from a remotely located station, establishing either direct or geared drive. The peculiar arrangement of fluid pressure control provides means for obtaining a controllable overlap of torque between the direct drive clutch 45—50 and the path comprised by the gearing, so that no neutral condition exists during the ratio shift transition. This method as noted before, contributes to smoothness and silence of operation.

The piston rod 57 is the brake actuating member, and has affixed compensator piston 70 in cylinder space 67 connected to the compensator cylinder inlet pressure line 68. When pressure is built up in cylinder 67 on piston 70, the motion of springs 61—62 and piston 58 is opposed, therefore means are thereby afforded to regulate the degree of force application on brake 30, therefore to control the braking capacity, as well as the direct drive clutch capacity.

Compensator valve 100 in valve body 91 is mounted conveniently to linkage connections joining to the motion of the engine accelerator pedal.

The servo pump 80 may only deliver a finite pressure at any one time. During the first phase of pressure increase in cylinder 60, when spring 71 is loading piston 60 the initial engagement stage of clutch 45—50 takes place. There is a rapid increase in volume, accompanied by a gentle rise in pressure in clutch cylinders 35.

After the abutments 59 and 66 meet, the increase of line pressure due to the added resistance of spring 63 now effective, causes a steeper rise of pressure on the clutch plates, yielding a graduated and increasing clutch torque capacity effect.

Throttle connected lever 10 operates against plunger 76, to manipulate differential valve 100. The external shell of plunger 76 is bored out internally to fit collar washer 77 slidable on the adjacent end of stem 78 of valve 100. Lock ring 79 prevents the washer 77 from further movement induced by tension in spring 89.

When lever 10 is rocked counterclockwise, the engine throttle is opened, and spring 89 is compressed, opposing the force of fluid pressure on the upper face of valve 100. This has the effect of graduating the port opening between the upper face and port 74, restricting the flow from port 73 to port 74, thereby reducing the pressure in line 75 and in cylinder 67.

At full pedal, the end of stem 78 meets the end of lever 10, and positive closure of the flow from port 73 to port 74 occurs.

The compensator control line 75 connects compensator outlet port 74 with passage 101 to check valve 105, and space 106 and check valve 110.

Check valve 105 seats against the pressure of line 75, and is open to passage 106, connected to port 107 of relief valve 115. The relief valve 115 has bosses 116 and 117 arranged in a balanced pressure manner, and may connect inlet port 107 with port 118 as shown, or else shift to the right from that position, and open relief port 120 to port 118. Relief valve 115 may be mounted in valve body 91, and is subject to servo line pressure through side passage 108 joined to servo line 38. Large boss 125 fits cylindrical bore 128 in body 91.

The control port 118 of the relief valve 115 is connected to the compensator cylinder line 68; likewise to port 119. The line 68 is joined to accumulator cylinder 113 by passage 112, so that at above a given pressure in line 68 piston 111 may compress spring 121, and thereby store a given quantity of liquid under line pressure. An excess quantity may drain back to the sump when accumulator piston 111 compresses spring 121 far enough to uncover exhaust port 122. This force storage means is therefore self regulating.

Relief port 120 of valve 115 connects to passage 114 and to fixed bleed port 124, the check valve 110 seating against the pressure in passage 114.

The principal object of the preceding described arrangement is to remove the shocks normally encountered in mechanisms of this character, and to coordinate the controls so that the ratio actuators for the clutches and brakes will be prepared in advance for whatever torques are needed to avoid overload and excess slippage as well as eliminate power surges in the transmission output system.

In net effect, by connecting the valve 100 to the operator's accelerator pedal as through lever 10, I have provided an instantaneous means for transmitting the varying torque demand of the car driver to the regulating system for both of the speed ratio actuators, in the present example, a clutch and a brake. Lever 10, however, may be independently driver-controlled.

At relaxed or "light" accelerator pedal, the valve 100 opens port 74 to pump port 73 and the compensator line 75 carries full pump pressure; whereas at full or advanced accelerator pedal positions, the valve 100 closes port 73 to pump pressure, and the compensator control line 75 carries a corresponding zero or low pressure. Port 69 is the exhaust outlet for valve 100.

When the servo control valve 90 is moved from the lower to the upper position, so as to connect pump pressure line 84 to servo line 38, for shifting ratio to direct drive; the piston 58 in cylinder 60 is moved against the action of springs 61—62, to release brake 30 of Figure 1, and thereby disconnect the geared drive in the transmission unit. At the same time, pressure in passage 41 and cylinders 35 is building up to load clutch 45—50 for engagement, to couple direct drive.

If this shift action is taking place at full or advanced throttle, the compensator line pressure is low, and therefore full pump pressure on pistons 36 of clutch 45—50 builds up very rapidly. If, however, the shift is made at light throttle, the valve 100 opens port 74 to pump port 73, and the pressure in line 68 and compensator cylinder 57 is relatively high, producing a net pressure in the clutch cylinders 35 of a lesser magnitude than when the accelerator pedal had been advanced.

The direct drive coupling clutch therefore is loaded to a capacity which varies directly with opening and closing of the engine throttle, and the variation in loading changes quickly, before the engine throttle variation can produce a corresponding increase or decrease in engine speed and power.

It can be stated that the car driver pre-selects the torque capacity of the direct drive coupling clutch by movement of the accelerator pedal; a high torque demand by the operator producing a high torque capacity in the clutch; and a low torque demand yielding a low torque capacity. This is not entirely correct, however, since my method also enables the capacity to be varied while the shift action is taking place. This latter characteristic renders the control more flexible, in that a car driver may encounter a series of circumstances in which he must change his mind, and relax the accelerator pedal suddenly after having it advanced, while the shift action of valve 90, piston 58 and clutch pistons 36 is then going on.

The above described regime is competent to yield an extremely smooth ratio shift from geared drive to the direct drive taken on friction clutches as shown in my demonstration, but a further extension of the overall controls is needed to provide a similar smoothness when shifting from direct to the geared drive.

This is accomplished by the utilization of the variable compensator line pressure to oppose the engaging action of springs 61—62 upon brake 30.

When the servo control valve 90 is moved "down" to exhaust position, the pressure falls in servo cylinder 60 and brake-applying springs 61—62 move rod 57 and compensator piston 70 against the head of liquid under pressure between cylinder 67 and check valve 105.

The liquid trapped in cylinder 67, line 68, accumulator cylinder 113, space 106 and ports 118, 119 and 107 of the relief valve, is compressed by brake springs 61—62 and a force is developed in control port 119 tending to shift relief valve 115 to the right against the opposing force on the face of large boss 125, from passage 108 and servo line 38. The servo line pressure in passage 108 will oppose the rightward shift of valve 115 until a given drop of pressure in line 38 occurs; whereupon the relief valve 115 will shift to the right, opening line 68 to relief port 120 and fixed bleed opening 124.

Now if the pressure in compensator pressure line 75 is high, as at low or relaxed throttle, check valve 110 will seat against the pressure in space 114 so that a given time interval must elapse before the fixed bleed port can relieve sufficient capacity from the trapped liquid behind compensator piston 70 to permit the brake rod 57 to move far enough to allow the brake 30 to lock drum 23 of Figure 1 against rotation. The full locking force of brake 30 is therefore delayed while the compensator action modifies the torque capacity of the brake. The engaging torque capacity is therefore of low value and built up over a relatively long time interval at relaxed throttle. As noted preceding, the final torque capacity may be built up to maximum when the transfer of ratio from clutch to brake, or from brake to clutch is completed.

When the shift to geared drive is made at full or at advanced throttle, the pressure in compensator lines 75—68 is low, and the check valve 110 will be therefore unseated by the pressure of the liquid being relieved, whereupon excess liquid in space 114 and line 75 may drain back to port 74 and to port 69 of the compensator valve 100 which exhausts to the sump. This effect occurs over a scale of compensator line pressures so that according to the accelerator pedal position, if fixed; or motion, if being moved; the rate of brake application therefore is coordinated with the torque demand of the operator; yielding a high braking engagement capacity when the speed control pedal 10 is advanced, and a low capacity when it is retarded. This effect is also scalar with respect to time, so that should the operator have to shift from one pedal position to another, while the valve 90 is being shifted from direct to geared drive compelling position, the compensator action on the braking capacity adjustment will be quickly readjusted to the new requirement.

The overall combination of operator torque demand control on the actuators for both upshift and downshift marks a great advance in the controls for present day motor car transmission systems, since the control for valve 90 may be operated not only by hand or foot selection means, but also by any of a large number of automatic devices such as speed governors, governor mechanism responsive to torque or to both speed and torque, acceleration and deceleration responsive controls, and combination forms of any of these co-linked with operator-operable means such as the engine throttle. Examples of such controls are shown in my pending U. S. S. N. 130,956, noted preceding, wherein automatic ratio selection means are described, involving operator torque demand. Regardless of the method used to shift the master control valve 90 between its speed ratio establishing positions, the torque capacity control provided for the direct drive and geared drive actuators may function continuously and modify the shift action for all changes and under all load conditions.

It should be clearly understood that my method of ratio shift torque capacity control is applicable to other forms of variable speed transmissions, and to other than strictly friction actuation means. It is within the purview of my invention to utilize it, for example, in a fixed countershaft, constant-mesh gearing assembly, wherein the brake actuator of the present example would become the clutch of the geared drive torque path although no claims are herewith drawn to such a combination, and no illustration thereof made. It is also within the scope of my invention to utilize it in combination with force transfer means such as liquid or electrical clutching devices, wherein the torque capacities may be varied according to my method. It was stated earlier in this specification that either of shafts 1 or 8 could be an input shaft, with the other the output shaft.

If shaft 1 be engine connected, the shaft 8 will be driven at reduced speed when the brake 30 is held. As shown in Figure 2, the transition in ratio from direct couple to braking couple, with normal right-hand engine rotation of shaft 1, will be accompanied by servo braking free from any self wrapping action until the instant the retrograde rotation of drum 23 slows down to zero speed, and endeavors to rotate reversely.

While this is a well-known effect in gearing utilizing rotatable reactor means, it seems important to dwell upon its particular utility with respect to my invention, since at the occurring of the negative rotational increment, when the self-wrapping action begins, the small residual torque in the clutch 45—50 is immediately dissipated.

It would be obvious to one skilled in the art to apply my invention disclosed herewith to an overdrive gear arrangement; or to other forms of step ratio gearing. The present example of the reduction gear is given to provide a clear description of the principles involved, with the shaft 1 of the simple two-speed gear, engine-connected.

On the other hand, if the shaft 8 is engine connected, the shaft 1 will be driven at overspeed when brake 30 is held. The transition from direct to geared couple, with normal right-hand engine rotation will also be accompanied by servo braking free from wrapping action down to zero speed of the drum 23.

Examination of Figures 1 and 2 will explain why this is so. With force applied of positive hand to carrier 15, the load resistance on drum 11 establishes a force diagram wherein reaction sun gear is subject to a positive force component. When coupled in direct, drum 23 rotates at engine speed, and when brake 30 is applied, the positive rotational energy must be absorbed. Since rotationally brake 30 cannot self-energise until a negative component is applied, my invention, in utilizing this principle, yields a smooth transition between direct couple and geared drive, in either a reduction gear or in an overspeed gear.

Furthermore, it is unimportant whether the geared drive of the present example is at a higher or lower speed ratio than the direct coupling drive. In fact, in practise, my invention is immediately adaptable to any speed ratio system wherein there are changes to be made between two different speed ratios, neither of which need to be a direct or one-to-one ratio, as is believed readily apparent. These fundamental principles are of wide and general application.

I have shown one form of transmission unit embodying the novel features of my invention, in which a new process of establishing the ratio shift interval is demonstrated. My invention may be embodied in other specific forms without departing from the spirit thereof, and the present embodiments are not to be considered as other than illustrative, nor in any sense restrictive; reference to the appended claims indicating the scope of the invention.

What I hereby claim as new and desire to secure by Letters Patent, is:

1. In power controls for variable speed gearing, in combination, a change speed transmission having clutch and brake speed ratio determining members, fluid pressure actuation means to actuate said members, a fluid pressure system connected to said means embodying a fluid pressure servo pump, an automatic pressure regulator valve controlling the output pressure of said pump, a directive valve to distribute the said output pressure to said means, auxiliary fluid pressure means arranged to provide a variable resistance to the actuation of said members by said actuation means, and control means continuously effective to variably regulate fluid pressure from said pump to said auxiliary fluid pressure means whereby the rate of actuation of both said clutch and brake members is variably controlled.

2. In variable speed gearing controls, in combination, an engine throttle-connected element movable with torque demand, a variable speed transmission having direct drive, and geared speed ratios, means connected to said element to shift the drive from one to the other of said ratios, and movable means responsive to said torque demand coacting with said first named means and constantly effective to establish a torque sustaining capacity of drive in said transmission proportional to said torque demand.

3. In power transmission controls, in combination, a throttle-connected element movable with variations in torque requirement variable speed gearing, a friction brake associated with said gearing, arranged to establish or to release reaction torque for determining the speed ration of said gearing, engagement rate control means for said brake, and a device connected to said element responsive to variations in torque requirement operative upon said means when said brake is establishing torque reaction.

4. In combination, a driving and a driven shaft, said driving shaft being driven by a throttle controlled engine, a friction clutch comprising members arranged to establish drive therebetween, a geared connection arranged to establish drive therebetween embodying a friction drive-sustaining means, engagement and disengagement control mechanisms for said clutch, a control element moved with the throttle of said engine, and a device connected to said element operative to proportion the torque capacity of both said clutch and said means according to predetermined conditions of load and speed of one of said shafts.

5. In combination, a driving shaft connected to a throttle controlled engine, and a driven shaft, a gradually actuable clutch arranged to establish drive therebetween, actuating control means for said clutch, friction means arranged to establish positive geared drive between said shafts when said clutch is disengaged, and a coacting device operative upon both said named means for regulating the loading thereof effective thereby to proportion the torque capacity of either of said means according to predetermined conditions of load and speed of one of said shafts.

6. In power transmission controls, in combination, a driving shaft, a driven shaft, an element adapted to determine the torque requirements of the drive between the shafts by varying the power and speed applied to said driving shaft, a direct drive clutch for establishing one-to-one speed ratio therebetween, a friction member for establishing a geared speed ration therebetween when said clutch is disengaged, actuating means for said clutch and said member, and a coordinating device connected to said element coacting with said means whereby both said clutch and said member are made effective to adjust torque capacity according to the torque requirements of the drive, in accordance with the movement of said element.

7. In power control devices, in combination, a step-ratio transmission arranged to couple a power source and a load, a plurality of engageable and disengageable members adapted to actuate change of speed ratio in said transmission and to sustain drive therein, a manual control element, fluid pressure means effective to actuate said members, auxiliary fluid pressure operated devices arranged to provide a variable resistance to the actuation of said members by said means, and control mechanism for said devices movable by said element operative to vary the net torque sustaining capacity of said members at the will of the operator.

8. In variable torque driving mechanism, in combination, a variable speed gear unit having a rotatable reaction member, gradually operable pressure engaged means arranged to permit or prevent rotation of said member, actuation means for said graduable pressure engaged means, a manual control element and an adjusting device moved by said element and coacting with said actuation means effective to proportion the degree of action of said gradually operable means proportionally to the torque requirement according to the will of the operator in moving said manual control element.

9. In power control devices, in combination, a variable speed transmission embodying a speed ratio actuating member, a force-applying means adapted to engage said member, a compensating means arranged to oppose the action of first named means, and force storage means connected to said second named means effective to limit the range of force within which said second named means becomes effective.

10. In combination, a variable speed transmission embodying members arranged to establish a plurality of speed ratios therein, actuation means for said members, a source of fluid pressure, a movable selector valve adapted to direct the fluid pressure of said source to said actuation means, auxiliary fluid pressure operated mechanism effective to provide a variable resistance to the actuation of said members by said fluid pressure, and graduation control means for said mechanism effective upon selecting movement of said valve to adjust the rate of establishing of drive by said members.

11. In power control devices, in combination, an engine, a speed controller for the engine, a variable speed transmission embodying a speed ratio actuating member, actuating means adapted to engage or release said member, a compensating pressure device operative upon said means for retarding the actuation of said member, pressure regulation means coacting with said device for controlling the rate of actuation of said member, a valve responsive to the difference in pressures of said compensating device and said regulating means, and a connection between said controller and said device operative to adjust the degree of retardation of the actuation of said member simultaneously with adjustments in engine speed.

12. In combination, a variable speed ratio transmission including low speed and high speed ratio actuating members, a fluid pressure servo pump, a selector control valve arranged to permit or prevent passage of pressure liquid from said pump, fluid pressure cylinders associated with both said members, a fluid pressure column connecting said cylinders with said valve, and a manually operable pressure regulating device operative to vary the effective pressure in said cylinders and in said column, whereby a variable engaging action of low or of high speed ratio by said members is provided.

13. In combination, a variable speed ratio transmission including a speed ratio actuation member, a compensator device adapted to control the rate of application of said member, a pressure adjusting means including an element arranged to initiate the regulating action of said compensator device upon said member, and a supplementary adjusting means responsive to the action of said device operative to vary the motion of said first named means after the initiating action of said element.

14. A speed ratio shifting member, loading means normally biasing the member to one speed ratio position, a fluid pressure actuated motor connected to said member, a movable selector valve adapted to admit fluid pressure to said motor from said pump or to exhaust fluid pressure therefrom, a compensator pressure element in said motor arranged to oppose the force of said biasing means, and a regulating device coacting with said element operative to respond to the exhaust pressure of said motor when said valve is moved to exhaust position.

15. In power control devices, in combination, an engine, a variable speed ratio transmission including a plurality of speed ratio actuating members, a fluid pressure system driven by said engine embodying a pump, a suction inlet, a pressure outlet, a pressure main and a regulating valve tending to maintain a constant pressure in said main when said pump is operating, a servo motor connected to said main and operative upon one of said members, a selector valve arranged to permit or prevent flow of fluid pressure from said main to said motor, and controlled pressure regulating means effective to graduate action of said motor when said valve is moved to prevent flow of fluid pressure from said main to said motor.

16. In combination, a driving shaft and a driven shaft, a variable speed transmission coupling said shafts, a first friction member adapted to establish one speed ratio of drive in said transmission, a second friction member arranged to establish a different speed ratio from that obtained by said first named member, actuation means effective to render inoperative one of the members while simultaneously rendering the other of said members operative, thereby establishing a condition of overlapping driving torque between said shafts, an operator-operated selector control for said means, and an auxiliary control operative when said first named control is selectively moved, to graduate the action of said actuation means upon either of said members.

17. In automatic power controls for motor vehicles, in combination, an engine, a throttle control for said engine, a power shaft connected to said engine, a variable speed transmission driven by said power shaft, a load shaft driven by said transmission, coupling and uncoupling mechanism within said transmission effective to establish a plurality of speed ratios therein, actuating means for said mechanism, auxiliary devices effective to provide a variable resistance to the actuation of said means upon said mechanism, selective control means for said actuating means, and a regulating device operative upon said devices, moved conjointly by said throttle control for regulating the rate of actuation of said actuating means upon said mechanism for engaging anyone of said plurality of speed ratios.

18. In overspeed gearing for motor vehicles, in combination, a transmission unit comprising a direct coupled drive means and an alternate overspeed gear drive means, actuator members for said means, fluid motor means arranged to actuate the shift between said drives by exerting force upon said members, a selector for said fluid motor means, and a compensating device coacting with said members and said fluid motor means effective upon selective motion of said selector to graduate the actuation of said members upon said drive means.

19. In a variable speed transmission having an input shaft, an output shaft and a reaction sustaining member rotatable positively and negatively with respect to the normal rotation of said shafts, a power brake mechanism effective upon said member for non-wrapping actuation thereof during positive rotation of said member, and thereafter effective for self-wrapping actuation thereof during incremental negative rotation of said member, a speed ratio selector adapted to permit or prevent actuation of said mechanism upon said member, and a manually operated compensating pressure device coacting with said mechanism to provide controlled graduation of force upon said member by said mechanism during positive rotation of said member when said selector permits actuation of said mechanism.

20. In power transmission devices, in combination, a variable speed gear comprising two concentrically rotatable gear elements and a third element on which planet gears are spindled, an input shaft connected to one of the elements, an output shaft connected with another of the elements, a reaction sustaining drum joined to another of the elements, a servo brake adapted to lock said drum against rotation, a fluid pressure servo motor arranged to actuate said brake, control valving manipulable to cause said motor to energise said brake or to render said motor inoperative to actuate the brake, fluid pressure compensating means associated with said motor arranged to govern the action thereof for regulating the rate of actuation of said brake, and additional control valving operative to vary the governing effect of said means upon said motor when said first named control valving is moved to cause energisation of said brake.

EARL A. THOMPSON.